Dec. 17, 1957    A. CASTEX    2,816,861
ARRANGEMENT FOR SUSPENSION OF ELECTRODES
Filed Feb. 29, 1956
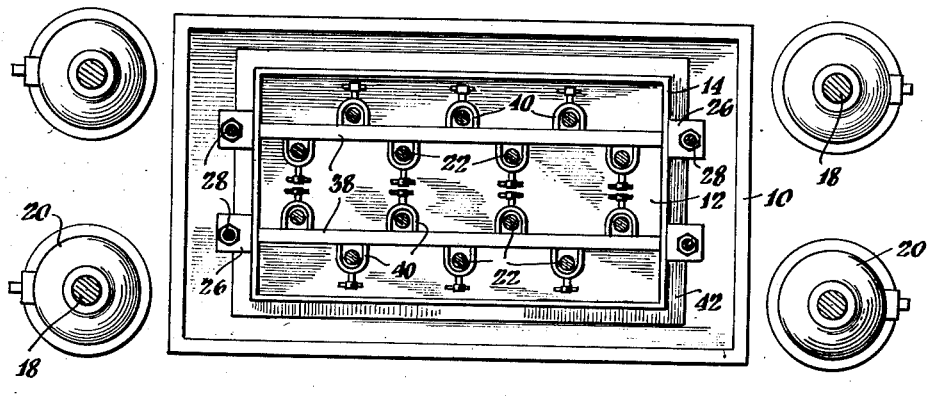
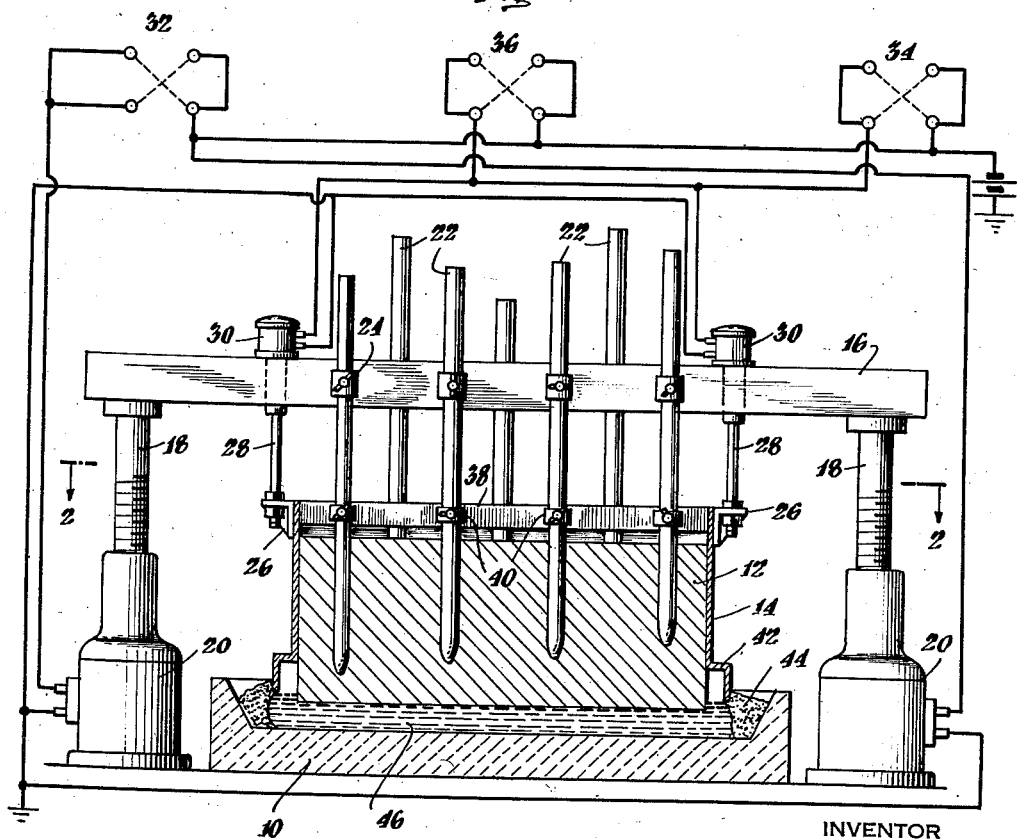
INVENTOR
*Andre Castex*
BY
*Eyre, Mann & Burrows*
ATTORNEY United States Patent Office 2,816,861
Patented Dec. 17, 1957

2,816,861

ARRANGEMENT FOR SUSPENSION OF ELECTRODES

Andre Castex, Riouperoux, France, assignor to Elektrokemisk A/S, Oslo, Norway, a corporation of Norway Application February 29, 1956, Serial No. 568,654

Claims priority, application Norway February 26, 1952

4 Claims. (Cl. 204—225)

In building pot lines for the production of aluminum, of the type using continuous electrodes suspended by vertical contact rods, it is customary to have a series of pots, and over each pot to have a fixed permanent construction from which the anode casing and the anode bus bars are suspended. The anode itself is suspended through the medium of the vertical contact rods which are connected with the bus bars.

In accordance with the present invention, in place of this fixed overhead construction running over the pots, I use a floating construction that functions both as the bus bar for the pot and also as the support or suspension member for both the anode itself and for its casing. Usually two bus bars will be employed but my invention can equally well be used with a single bus bar. Of course, the actual bus bar may have supplemental strengthening members associated with it, if desired, and the complete construction including any such strengthening members is here referred to as the "bus bar." Such bus bars may be supported or suspended at their ends in any desired way provided that they can be moved up and down vertically in the general manner hereinafter described. By using the bus bars as the member from which both the anode and the anode casing are suspended it is readily possible to move these two members simultaneously as a unit when ocassion occurs, as when the pots are tapped and the level of the bath is lowered substantially; or in some cases where a pot is shut down temporarily, it may be necessary to lower the anode enough to short-circuit the pot. Being able to move the anode and the anode casing simultaneously and in unison makes for substantially improved operation at such times.

In the ordinary operation of the pot, the casing is maintained in fixed position and the anode is fed slowly down through the casing by periodic movements. The most practical way of feeding the anode downwardly is by lowering the bus bars, but where the casing is hung from the bus bars this would tend to lower the casing. I have overcome this difficulty by providing motors for driving the jacks that support the bus bars and by providing synchronously operated jacks which control the movement of the casing relative to the bus bars. While it might be possible to operate the parts properly with independent switches connected with these motors, I preferably supply one switch mechanism through which the bus bars can be moved up or down without operating the motors that control the casing. A second switch is provided which so operates the motors that when the motors of the jack supporting the bus bars are operated to raise the bus bars, the motors which control the position of the casing are simultaneously and synchronously operated but in the opposite direction so that when the bus bars are being raised the casing will be lowered relative to the bus bars and vice versa. Since the movement of these motors will be opposite to each other, this means that the operation of this switch will move the bus bars and the anode but the casing will remain in substantially fixed position. A third switch is supplied for independently operating the motors which control the casing.

When in ordinary operation the anode has been fed downwardly to such an extent that the bus bars have reached their lowermost position, it is necessary to raise the bus bars without releasing the anode. For this purpos support means is provided for connecting the vertical contact rods to the anode of the casing. Such support means may either be a permanent set of support bars forming part of the casing or removable bars may be used. During this operation a sufficient number of the contact rods of the anode are connected to these support bars of the casing so that the anode and casing are virtually locked together. The contact rods of the anode are then disconnected from the bus bars and the switch is operated which raises the bus bars while simultaneously lowering the casing relative to the bus bars, that is, the bus bars are raised without moving the casing. When the bus bars are in their top position, the anode support rods are again connected to the bus bars and the connection between these rods and the casings is released.

By this construction great flexibility of operation is obtained, and as stated I do away with the necessity of having any fixed and permanent overhead construction and rely on the movable bus bars (including any associated strengthening members) as the sole supporting mechanism for the anode and its casing.

This invention can readily be understood by reference to the accompanying drawings in which Fig. 1 is a longitudinal sectional view through a pot unit constructed in accordance with this invention, and Fig. 2 is a section on line 2—2 of Fig. 1.

In the drawings, 10 is the pot or cathode member, 12 is the anode formed in a casing 14. Bus bars 16 pass over the top of the structure and are here shown as supported on columns 18 which are vertically movable to serve as jacks operated through motors 20. The anode 12 is supported by vertical contact rods 22 which are connected by clamps 24 to the bus bars 16.

The casing 14 is supplied with flanges 26 to which are attached the hangers 28 which are connected to the electrically driven jacks 30. It is an important feature of this invention that the motors 20 and 30 can be driven in either direction and their speeds are so synchronized that if the motors 20 are operated to raise the bus bars 16 and at the same time the motors 30 are operated to lower the casing 14 relative to the bus bars, the casing 14 will remain substantially fixed and unmoved. In order to operate these motors, three switches are preferably provided at a convenient operating point. These switches are designated 32, 34 and 36. The switch 32 controls only the motors 20 and by operating this switch the bus bars 16 may be raised or lowered without operating the motors 30. When the switch 34 is operated, the motors 20 again can be used to either raise or lower the bus bars 16 but in this case as the bus bars 16 are raised the motors 30 are operated to lower the casing 14 relative to the bus bars 16 so that the casing 14 remains substantially unmoved. The motors 30 and the driving mechanism associated with them should be so connected to the bus bars 16 that a positive force can be exerted on the hangers 28 whereby the casing can be positively forced away from the bus bars. This is desirable because if it becomes necessary to raise the anode without raising the casing, the anode may stick to the casing and tend to lift it up against the force of gravity. This is not possible with the motors 30 positively forcing the casing and bus bars apart.

The casing 14 is here shown as provided with longitudinal bars 38 near the top. These bars 38 are provided with loops 40 which serve as guides to maintain the vertical contact rods 32 in proper alignment and also can be used as clamps for attachment to the vertical contact rods 22, thereby connecting the anode 12 so that it cannot drop relative to the casing 14. This permits the clamps 24 to be loosened when it is desired to raise the bus bars 16 relative to the casing 14. For this operation the switch 34 will be employed operating motors 20 and 30 synchronously in opposite directions.

In the construction shown the casing 14 is provided with a gas-collecting channel portion 42 which makes a sealing connection with the crust 44 of the bath 46 in the pot 10.

In the ordinary operation of a pot of this type, when metal is tapped from the pot the level of the bath may drop by as much as 2 to 4 inches. With a variation of this size, if the casing is not movable there is danger that the seal between the casing and the crust may be broken letting air into the gas channel or the gas channel portion 42 may be positioned so low that when the level of the reduced metal is high, the bath will be so close to the channel member that it will be weakened or actually melted.

Again if the casing 14 is not movable, there is danger that when the anode 12 is lowered to operating position after the metal has been tapped off, portions of the electrode which have not become properly hardened will emerge from below the casing and be suddenly exposed to high temperatures while still containing substantial quantities of volatile matter. This will mean a sudden increase in the tar content of the gases which will interfere with the usual manner in which the gases are handled.

With the construction of this invention, both of these difficulties can readily be overcome, for when the metal is tapped out, the switch 32 is operated to lower the bus bars 16 and with them the casing 14 and anode 12.

For the return movement the casing and anode may be lifted simultaneously or the casing 14 may be lifted gradually but independently, through the use of switch 36, while leaving the anode mass down to compensate for combustion of the anode at its lower end.

The ordinary adjustments of the anode relative to the bath which have to be made frequently during the operation of the furnace will be made through the use of the switch 34 which will cause the anode to move while maintaining the casing in fixed position. In this connection if the anode is raised relative to the casing the two may stick together and there may be a tendency for the casing to be lifted up with the anode. Since the jacks 30 are so constructed as to give a positive thrust against the casing, this is not possible with my new construction.

After the bus bars 16 have been lowered to their bottom-most position due to the consumption at the bottom of the anode 12, a special operation is necessary for raising the bus bars without raising the anode. For this step, as pointed out above, the anode 12 is locked in position relative to the casing 14 by the use of the support bars 38 and the clamps 24 are released. The bus bars may then be raised for a new cycle of operations without the anode or casing being moved. This will be done through the use of the switch 34.

From the foregoing it will be seen that my new construction not only does away with the necessity of a fixed overhead suspension construction but gives greatly increased flexibility in the operation of the anode and casing.

This application is a continuation-in-part of my earlier copending application, Serial No. 338,841, filed February 25, 1953, now abandoned.

What I claim is:

1. A pot construction for the production of aluminum characterized by the fact that it avoids the necessity of a permanent fixed overhead support construction above the pots, comprising a pot constituting a cathode, an anode of the continuous type, a casing for such anode above the pot, vertical contact rods in the anode by which the anode is suspended, a bus bar above the casing to which said contact rods are clamped, a first set of motor-driven jacks supporting said bus bar, suspension members for hanging said casing from the bus bar, a second set of motor-driven jacks associated with said suspension members for moving the said casing relative to the bus bar, said second set of jacks being synchronized with said first set of jacks so that if the bus bar is raised while the anode contact rods are clamped to it and simultaneously the casing is lowered relative to the bus bar, the anode will move but the casing will remain substantially stationary, a first switching means for independently operating said first and second sets of jacks and a second switching means for synchronously operating the first and second sets of jacks so that the bus bar with attached anode contact rods is raised simultaneously as the casing is lowered relative to the bus bar, and the casing remains substantially stationary relative to the pot.

2. A structure as specified in claim 1 which further includes means for releasing the clamping means for holding the contact rods clamped to the bus bar and means connected with the casing for locking the anode contact rods in fixed relation thereto.

3. A structure as specified in claim 1 in which at least two bus bars are used above each pot.

4. A structure as specified in claim 1 in which the ends of the bus bars are supported on columns operated by said first motor-driven jacks.

References Cited in the file of this patent

UNITED STATES PATENTS 2,526,875    Jouannet _____ Oct. 24, 1950